Nov. 21, 1950     S. W. LANGDON     2,531,376
PHOTOGRAPHIC CAMERA HAVING MEANS FOR
FEEDING A PLURALITY OF FILM STRIPS
Filed Oct. 30, 1944     9 Sheets-Sheet 4
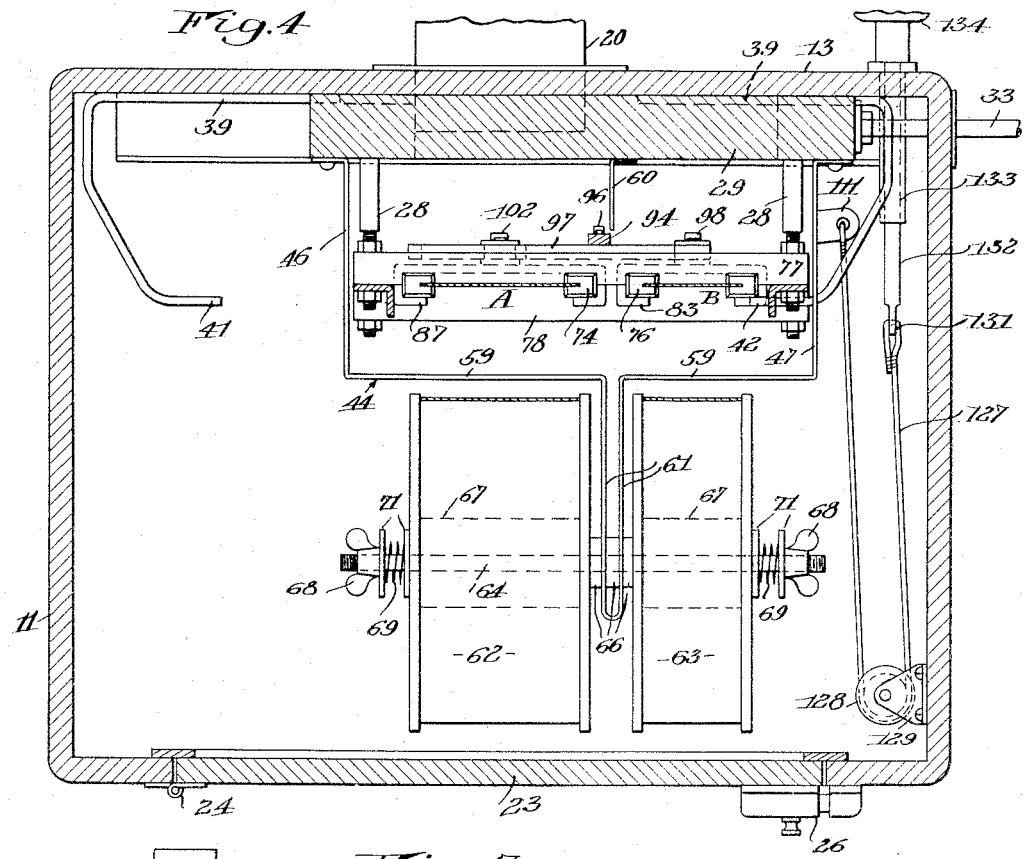
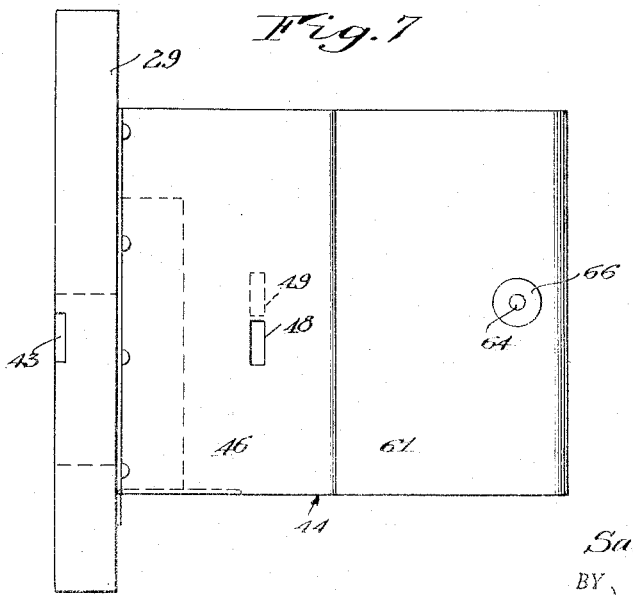
INVENTOR.
Samuel W. Langdon
BY
Winslow E. Thurson
his Attorney

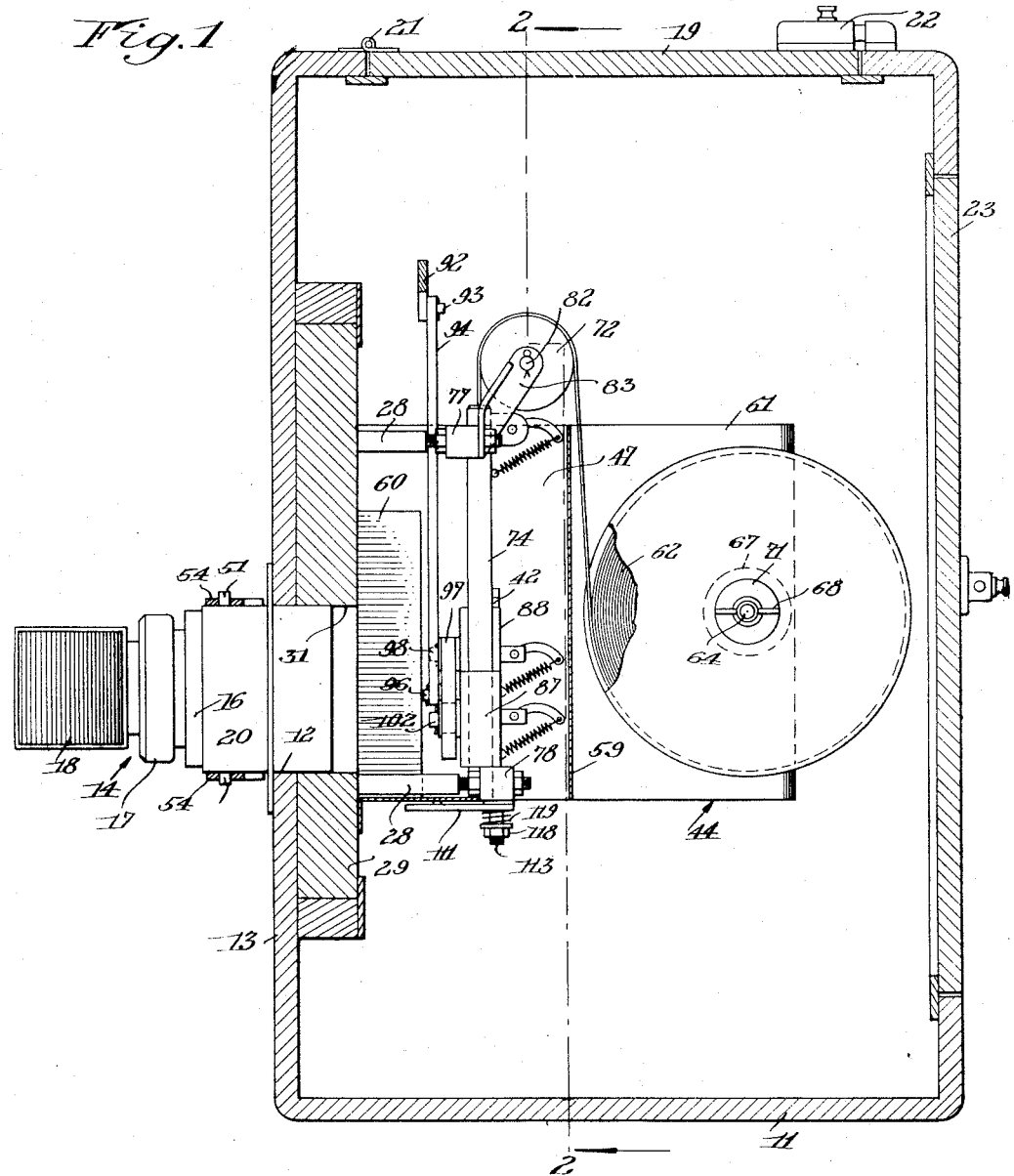

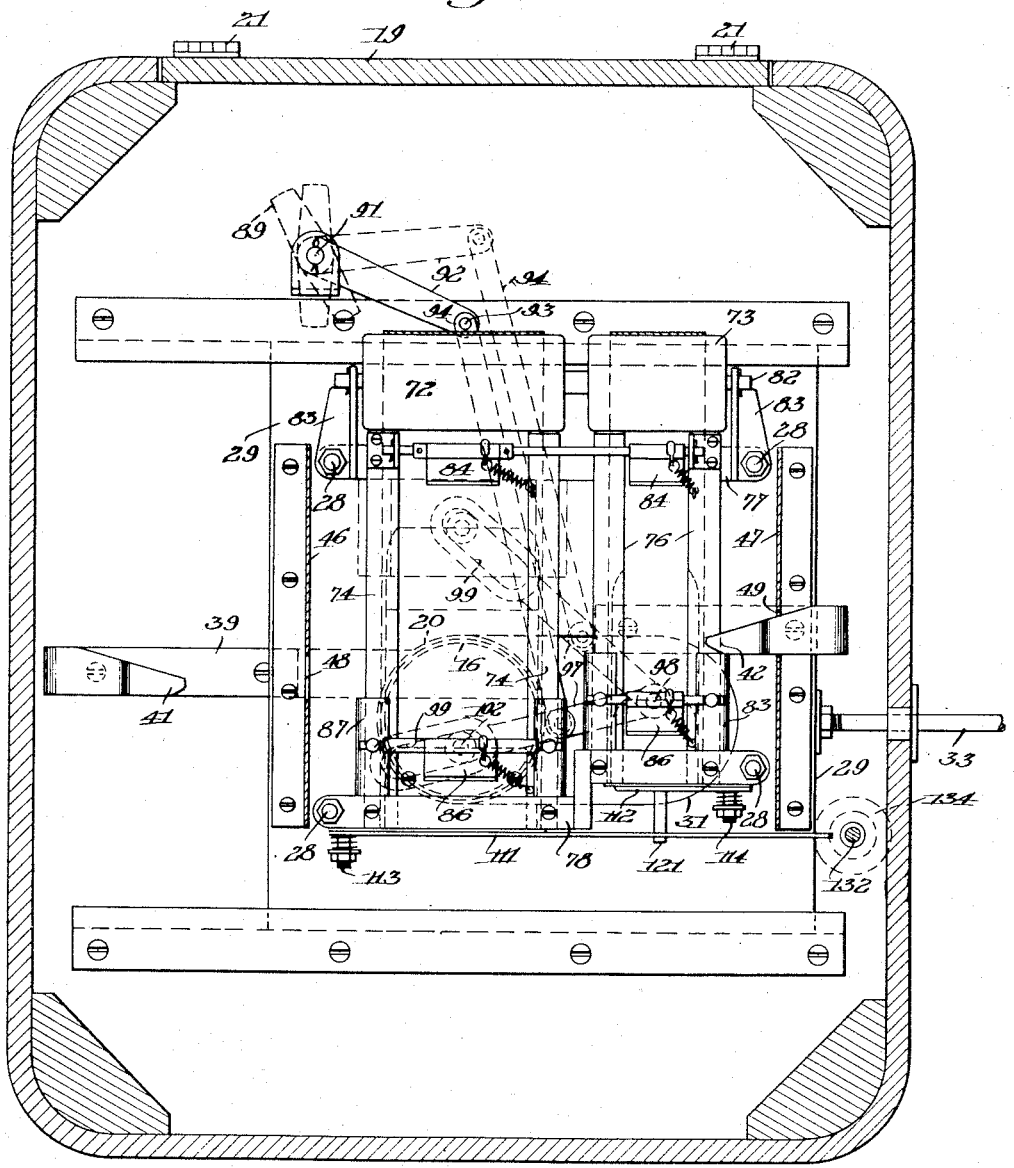

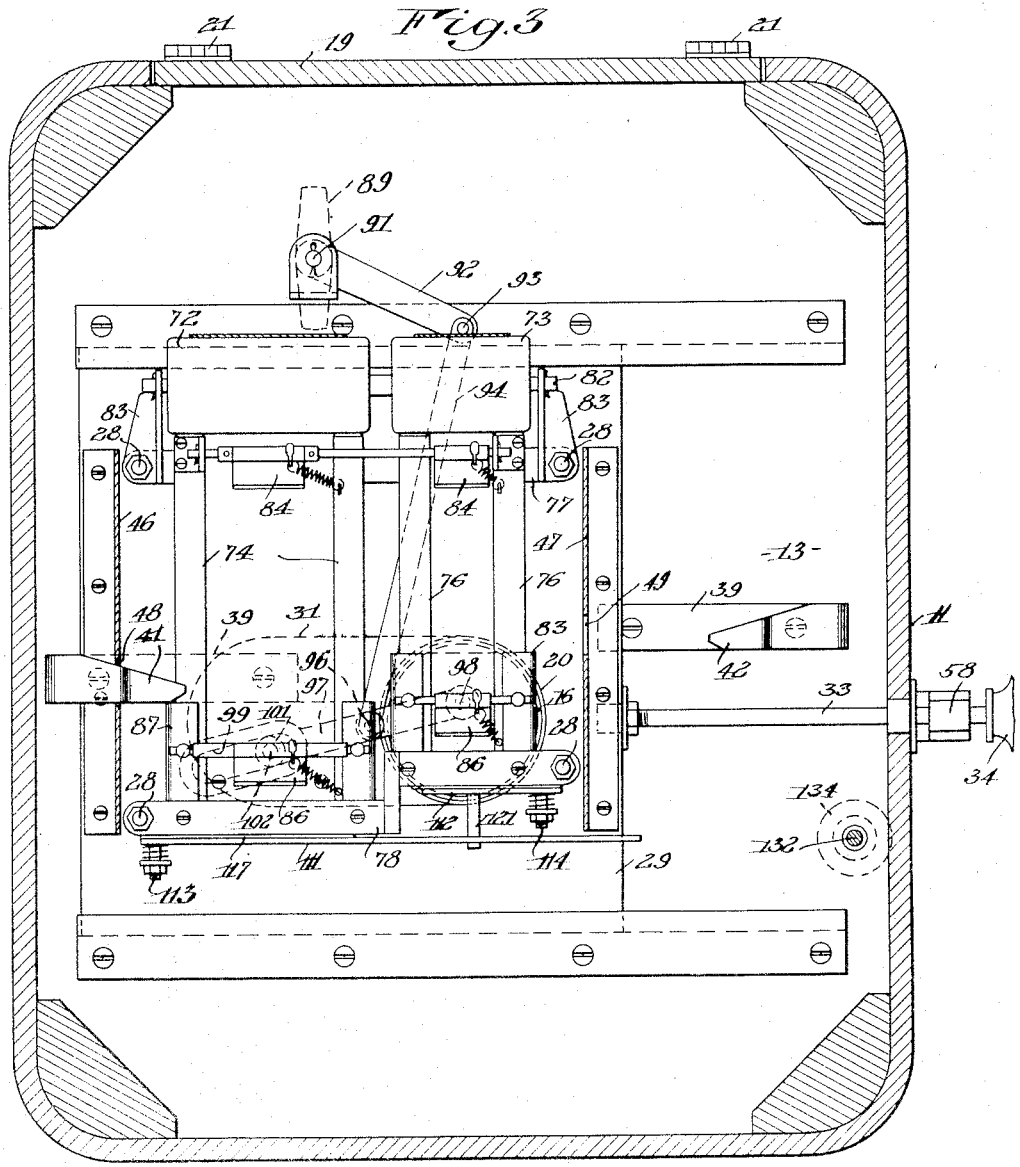

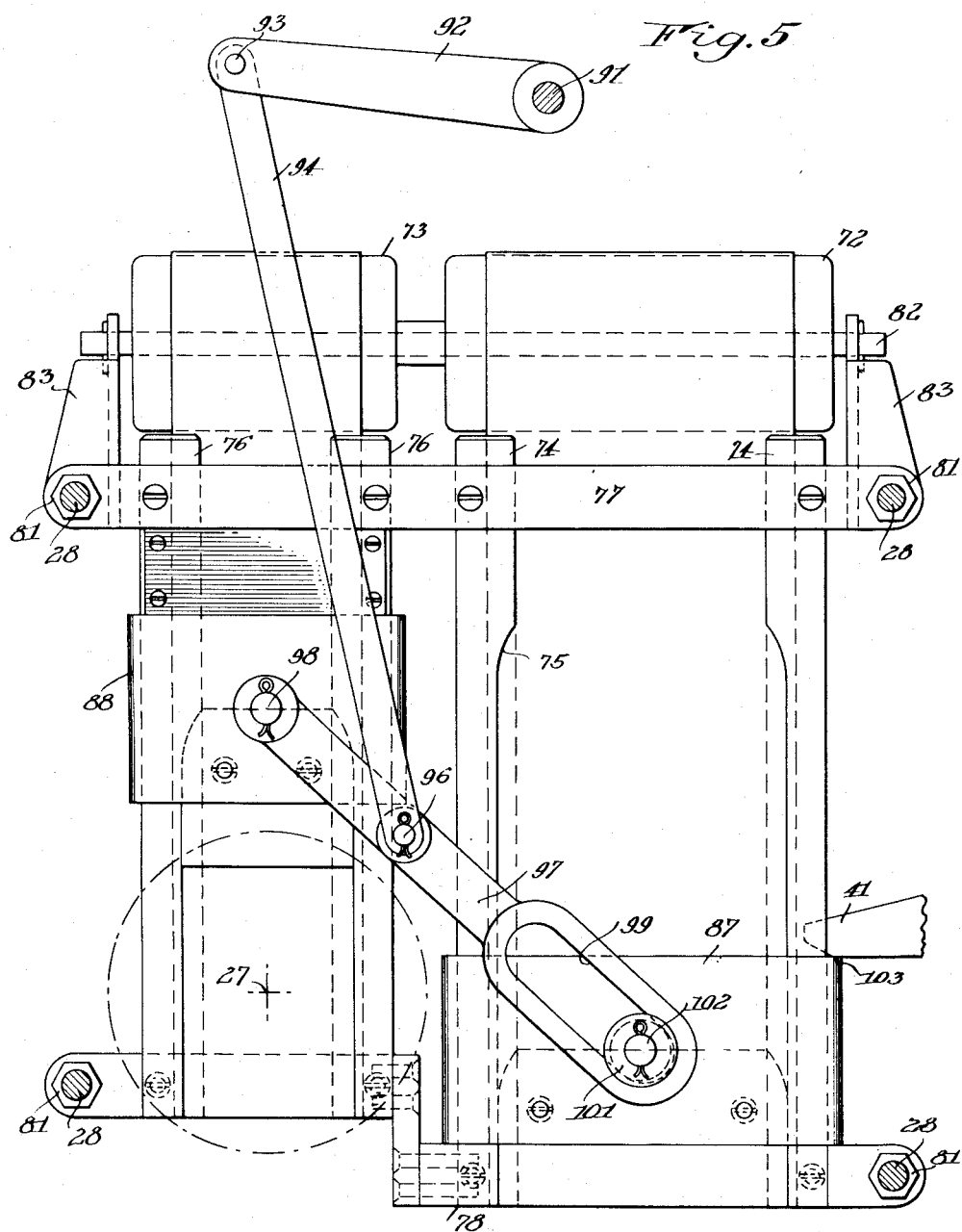

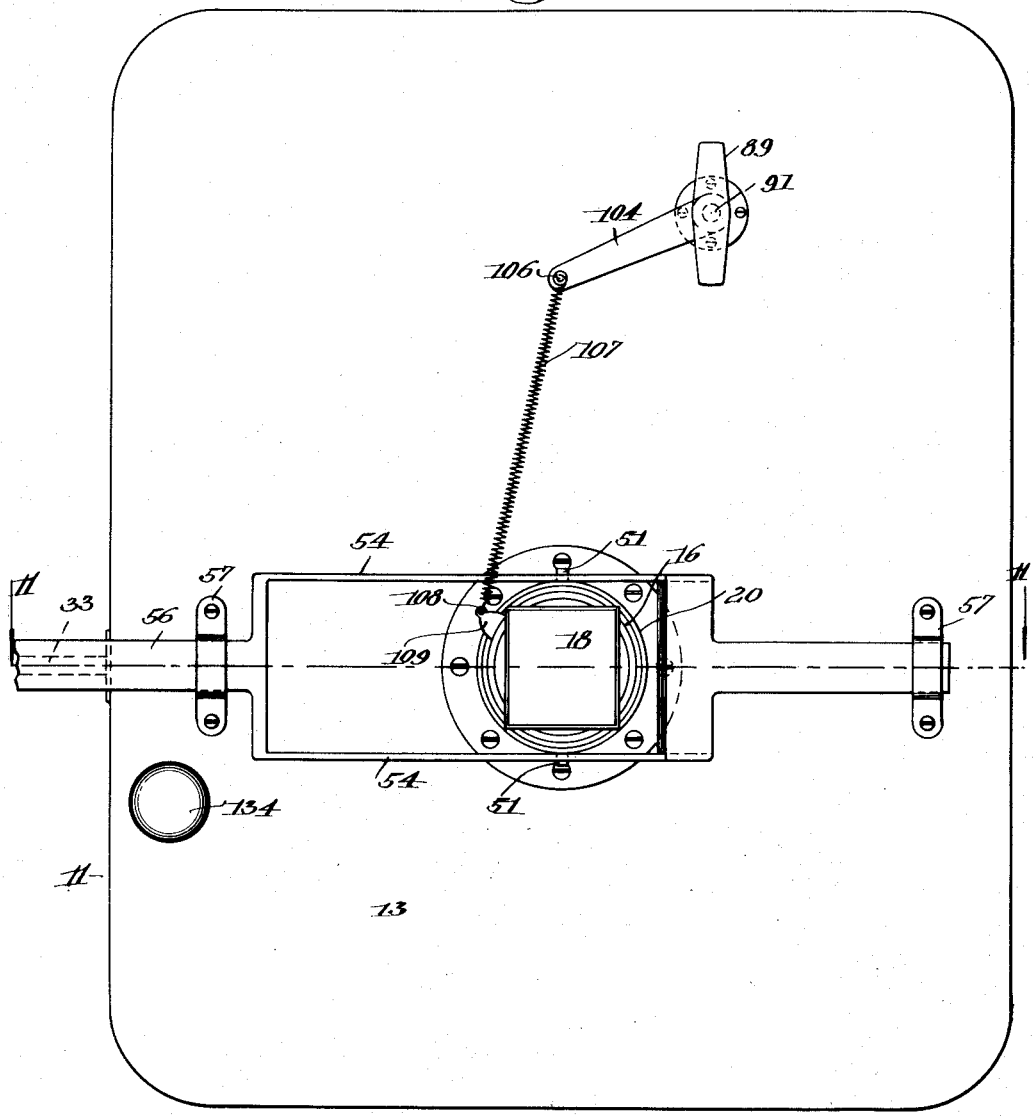

Nov. 21, 1950 — S. W. LANGDON — 2,531,376
PHOTOGRAPHIC CAMERA HAVING MEANS FOR FEEDING A PLURALITY OF FILM STRIPS
Filed Oct. 30, 1944 — 9 Sheets-Sheet 7

INVENTOR.
Samuel W. Langdon
BY
his Attorney

Nov. 21, 1950 S. W. LANGDON 2,531,376
PHOTOGRAPHIC CAMERA HAVING MEANS FOR
FEEDING A PLURALITY OF FILM STRIPS
Filed Oct. 30, 1944 9 Sheets-Sheet 8
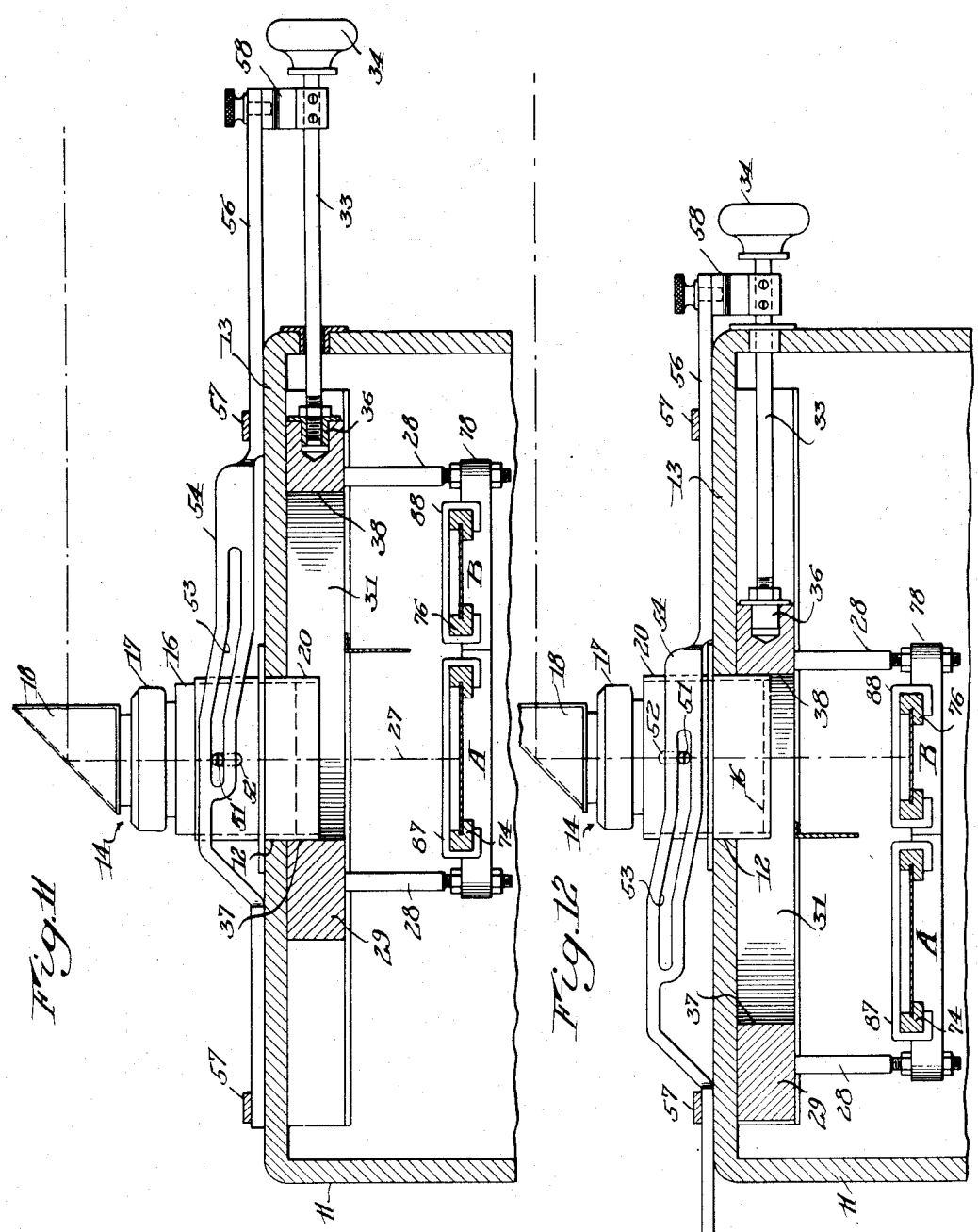
INVENTOR.
Samuel W. Langdon
BY
his Attorney

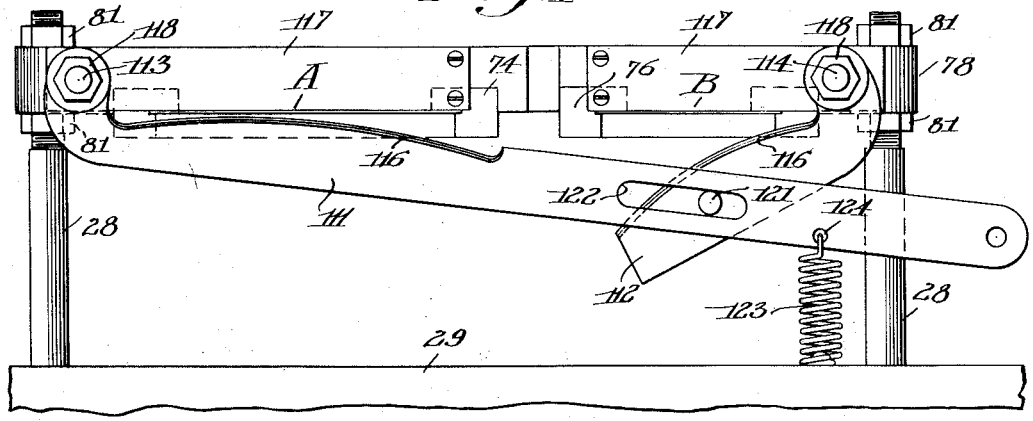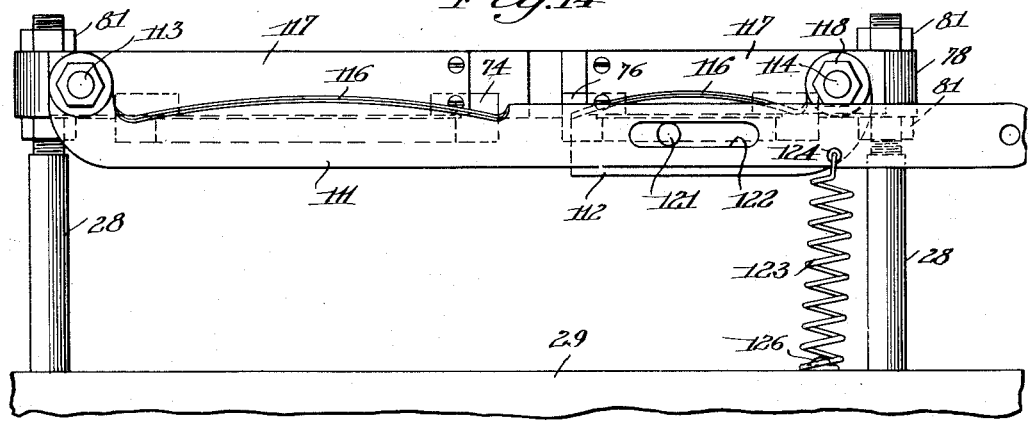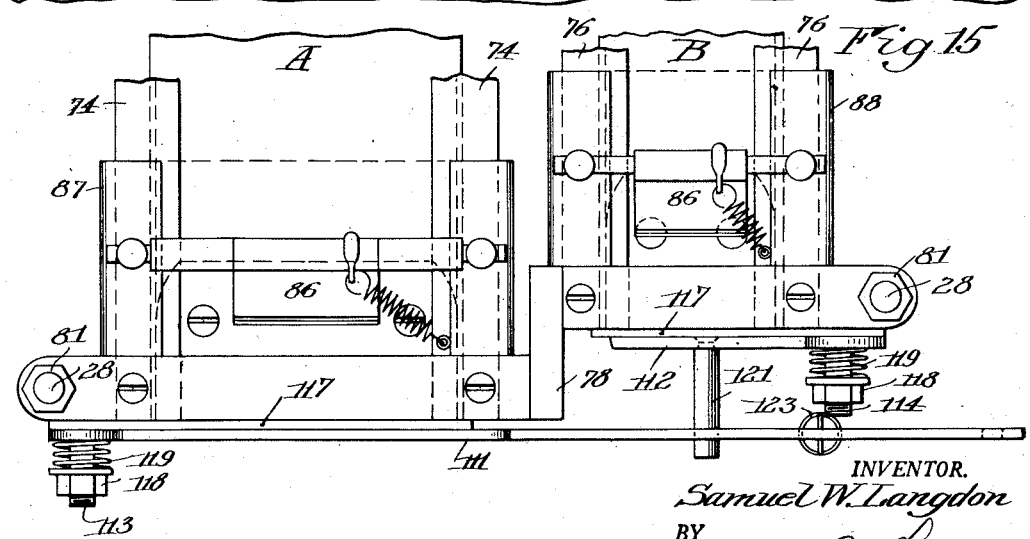

Patented Nov. 21, 1950

2,531,376

UNITED STATES PATENT OFFICE 2,531,376

PHOTOGRAPHIC CAMERA HAVING MEANS FOR FEEDING A PLURALITY OF FILM STRIPS

Samuel W. Langdon, Rochester, N. Y., assignor, by mesne assignments, to Marks & Fuller, Inc., a corporation of New York Application October 30, 1944, Serial No. 561,129

9 Claims. (Cl. 95—31)

My invention relates to a photographic camera and more particularly to what may be termed a duplex camera for taking pictures of two different sizes or making exposures on either of two widths of light sensitive material. The principles of my invention have been, for the purpose of illustration, incorporated in a camera of the direct positive type which reproduces the subject without reversal direct on the light sensitive material or film.

An object of my invention is to provide a simple and conveniently operated camera which is adapted to selectively take either of two sizes of pictures or make exposures on either of two widths of light sensitive paper or film.

Another object of my invention is to provide a direct positive camera having means for feeding light sensitive paper strips which may be of two different widths and in which means are provided whereby the same manual control mechanism may be employed for automatically and selectively feeding either strip and thereby the possibility of the photographer becoming confused and operating the wrong strip feeding device is eliminated.

Another object of my invention is to provide a camera capable of taking pictures on two different strips of light sensitive material or film, the camera being equipped with a manually operated element which enables shifting of the desired light sensitive strip into the exposure position and thereby simultaneously and automatically adjust the lens film distance to conform to the size of the picture being taken.

Another object of my invention is to provide a camera in which exposures may be made preferably on two different widths of light sensitive paper or film strips and in which a single operating lever is employed to feed selectively either of the film strips and the same operating lever trips the camera shutter at the proper time after the film feed carriage has been removed from the exposure position.

A further object of my invention is to provide in a camera capable of making exposures on either of two strips of light sensitive material a cut off in which the same manual control serves to actuate the cut off mechanism for both strips of light sensitive material.

My invention, in addition, contemplates the provision of a direct positive camera wherein a single lens system may be employed for making exposures on either of two strips of light sensitive paper preferably of different widths, the camera being provided with means for selectively positioning the desired strip in the exposure position of the lens system and the same means being employed to adjust the lens to sensitized paper distance; the camera further being provided with a single operating lever adapted both to feed either of the strips depending upon which strip is in the exposure position and at the proper time to trip the camera shutter.

Other objects and advantages of my invention will be set forth in the claims and will be apparent from the following description, when taken in connection with the drawings, in which:

Fig. 1 is a vertical sectional view through the camera of my invention showing the feeding mechanism for the strips of light sensitive paper and the rolls for carrying the paper, with the assembly being mounted as a unit upon a single shiftable block or carrier;

Fig. 2 is a sectional view taken substantially on the line 2—2 of Fig. 1 in the direction indicated by the arrows, with the parts in the position they occupy when exposures are to be made on the wider of the two strips of sensitized paper;

Fig. 3 is a view similar to Fig. 1 with the supporting block or carrier shifted so that the narrower of the two sensitized strips is in the exposure position;

Fig. 4 is a top plan view showing the sensitized strip feeding mechanism and showing also the spools for carrying the sensitized paper, the stops for the strip feed carriages and the operating elements of the cut off mechanism;

Fig. 5 is an enlarged front elevation showing the operating elements for actuating the feeding mechanism for feeding both sensitized strips;

Fig. 6 is a view of the shiftable support block or adjustable carrier showing the elliptical opening allowed therein for accommodating the lens housing or support;

Fig. 7 is a view showing the housing or light guard which extends around the film strips for preventing access of light thereto;

Fig. 8 is a front elevation of the camera showing the film feed operating handle and shutter tripping mechanism, together with the means for adjusting the lens to sensitized paper distance;

Fig. 11 is a sectional view taken substantially on the line 11—11 of Fig. 8 with the parts in the position they occupy when exposures are to be made on the wider of the two sensitized strips;

Fig. 12 is a view similar to Fig. 11 with the parts in the position they occupy when exposures are to be made on the narrower of the two sensitized strips;

Fig. 13 is a view showing the cut off mechanism out of shearing position;

Fig. 14 is a view similar to Fig. 13 with the cut off knives in shearing position; and Fig. 15 is a rear elevation of a part of the feeding mechanism showing the relationship of the cut off mechanism thereto.

Figure 9:
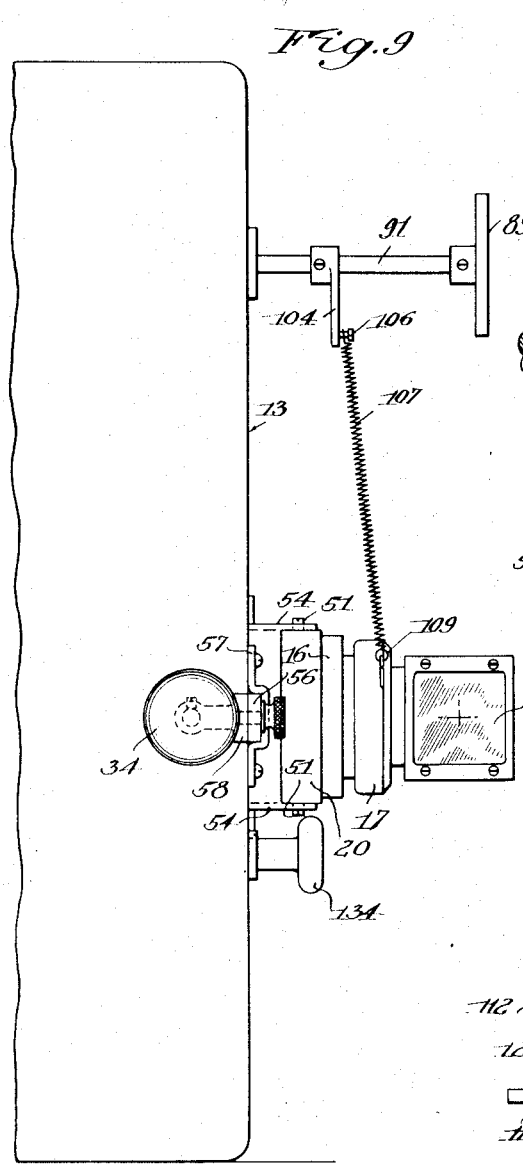
Fig. 9 is a side view of Fig. 8 with the prism of the lens system facing in the direction toward which the picture is taken.

The photographic camera of my invention comprises a light tight box or enclosure, generally indicated by the numeral 11, which has a lens opening 12 in the front wall 13 thereof. The lens assembly per se, generally indicated by the numeral 14, constitutes no part of my present invention but in general comprises a lens element or elements mounted in a housing 16 and a housing 17 in which a camera shutter of any suitable type may be mounted.

Mounted ahead of the shutter and in fixed relation thereto and the lens elements, is a prism 18 which may be suitably mounted and functions in a manner well known in the art. The prism, together with the lens system, accomplish a double reversal of the subject so that the image reproduced on the light sensitive material is an exact reproduction of the subject. The direct positive photographic process is well known in the art to which this invention applies and requires no further explanation. The lens system is carried in and is slidable with respect to a sleeve or collar 20 in a manner presently to be described.

The light tight box or enclosure may be of any suitable construction and may be provided with suitable openings for gaining access to the operating mechanism for the purpose of adjustment and repair thereof. For example, the top of the camera as shown in Fig. 1 may be provided with a door 19 having a suitable hinge 21 and latch 22. The light tight box may also have a door 23 at the rear thereof which may be provided with a hinge 24 and a latch 26.

One of the important aspects of the camera of my invention is that with a single lens system the camera is adapted to make exposures on two different strips of light sensitive paper or film A and B shown most clearly in Figs. 11 and 12. In the preferred form of the invention the strips are of different widths although it would be possible to obtain exposures of different size by employing two strips of the same width and varying the feed of one of the strips. To accomplish the above, although it would be possible to move the axis of the lens system with relation to the light sensitive strips A and B, I prefer instead to maintain the axis 27 of the lens system in a fixed position and shift the light sensitive strips into and out of proper relationship with respect to the lens axis. This arrangement is of material advantage as a shifting of the lens system requires an adjustment of the photographic subject in case it is desired to take pictures of the same subject on the two sizes of light sensitive material.

As shown in the drawings and as will presently appear, substantially the entire operating mechanism is carried by supporting rods 28 on a shiftable block or carrier 29. As shown most clearly in Fig. 6 the carrier 29 has an elliptical opening 31 for the reception of the inwardly protruding collar 20 which slidably supports the lens housing.

In the present embodiment of my invention the elliptical opening has its long axis extending horizontally although it will be appreciated that this may be varied to suit the particular design of camera. A rod 33 has an operating handle or hand piece protruding from the camera box or cabinet in position for convenient manual operation by the photographer. The inwardly extending end of the rod is threaded for reception in a socket 36 mounted in and fixed with respect to the carrier 29.

It will now be apparent that by actuating the hand piece 34 the carrier may be shifted from the position shown in Fig. 11 to that shown in Fig. 12 to center either the light sensitive strip A or the light sensitive strip B with respect to the lens axis 27. In shifting the light sensitive strips, engagement of the carrier with the protruding end 32 of the lens collar, as shown at 37 in Fig. 11, and as shown at 38 in Fig. 12, results in the collar acting as a stop for the carrier to secure proper centralization of the light sensitive strips A and B with respect to the lens axis 27.

As shown most clearly in Fig. 4, metal strips 39 are carried on the inner surface of the front wall of the camera and have bent and rebent portions terminating in fixed ends or stops 41 and 42, the purpose of which will later appear. To accommodate the metal strips 39 the carrier, as shown in Fig. 7, has slots 43 so that the carrier may be shifted with respect to the metal strips 39.

As will be more fully described later the light sensitive strips are substantially entirely enclosed by a light guard, generally indicated by the numeral 44, which has side walls 46 and 47. The side wall 46 of the light guard 44 has an opening 48 and the side 47 of the light guard has an opening 49 for the reception, respectively, of the ends or stops 41 and 42. Thus when the parts are in the position shown in Figs. 2 and 4 the stop 42 lies within the light guard and when the carrier 29 is shifted to the left, as viewed in Fig. 4, to the position shown in Fig. 3 the stop 41 enters the light guard.

It will be appreciated, when it is desired to make exposures on the narrower strip of sensitized material B, it may be desirable to change the position of the subject which will require that the back focus or the distance between the lens and the strip of sensitized material be varied accordingly. This might be accomplished by a manual adjustment of the lens system inwardly and outwardly with respect to the strips of sensitized material. Moreover, the same end result could be accomplished by adjustment of the strips of sensitized material toward and from the lens either manually or automatically with the shifting of the carrier 29. However, it is distinctly of advantage to arrange the camera so that the distance between the lens and the strips of sensitized material may be varied automatically and preferably by adjusting the lens toward and from the strips of light sensitive material during and simultaneously with the shifting of the carrier 29.

This adjustment of the lens may be accomplished by providing the lens housing with a pair of pins 51 (Fig. 8) which extend outward through slots 52 formed in the lens housing support collar 20. Any suitable means may be provided for shifting the lens assembly with respect to the collar 20 but the arrangement shown is convenient in that the pins 51 may be received in cam slots 53 formed in the bifurcated arms 54 of a slide bar 56. The slide bar 56 is carried by suitable brackets 57 and is normally tied to the rod 33 so as to be shiftable therewith by means of a connecting piece 58. The connecting piece 58 is held with relation to the slide bar 56 by a set screw 60.

With the arrangement shown and described when the carrier 29 is shifted to bring the narrow strip of light sensitive material B into proper relationship with respect to the lens axis 27 the slide bar 56 is actuated so as to shift the lens assembly with respect to the lens housing support collar 20 and toward the plane of the strips through the action of the pin and cam slot connection above mentioned. When desired the set screw may be loosed to permit the independent focusing of the lens.

Of particular importance is the fact that the same manually operated element 34 which controls the shifting of the lens strips into and out of the exposure position also controls the adjustment of the lens toward and from the sensitized strips. This is important for the reason that it eliminates the possibility of error which might occur with separate manual controls by reason, for example, of failure to adjust the lens assembly to the focal position required for cooperation with the particular width of sensitized material upon which the photograph is to be taken.

The means for protecting the sensitized materials against light, in addition to the light guard 44, includes a light guard 65 supported from the carrier. The light guard 65 extends between the sensitized strips in a position to guard the sensitized strip out of the exposure position from stray light when the shutter is tripped to make an exposure on the other strip.

The light guard 44 may be of any suitable construction and, in addition to the side walls 46 and 47, includes a rear wall 59 which may be provided with rearwardly extending parts 61 forming a support for spools 62 and 63 for carrying the unexposed light sensitive paper. The spools are carried by a rod 64 which extends through openings formed in the rearwardly extending support parts 61, the spools being spaced from the adjacent parts 61 by suitable washers 66. The spools 62 and 63 are provided with suitable cores 67 preferably of wood which carry the light sensitive material and are free to rotate upon the rod 64. The ends of the rod are threaded to receive wing nuts 68 which serve to apply pressure on springs 69. The springs 69 lie between suitable washers 71 and serve to apply sufficient resistance to rotation of the spools 62 and 63 to maintain the strips of light sensitive material somewhat taut.

From the spools the strips extend forward over preferably wooden rolls 72 and 73 (Figs. 1, 2 and 3) and thence downward to the feeding mechanisms for the light sensitive strips. In general the feeding mechanism for the light sensitive strips may be of any suitable type but I prefer to employ the feeding mechanism shown and described in my copending application, Serial No. 552,711, filed September 4, 1944, now Patent No. 2,388,423, issued November 6, 1945.

The film feeding mechanism per se constitutes no part of my present invention and reference is made to said application for a complete disclosure thereof. For the purpose of this application it is sufficient to state that the strips are supported in and fed through longitudinally extending grooves 75 (Fig. 5) provided in guide bars 74 and 76. The guide bars are carried by an upper cross support 77 and a lower cross support 78 (Fig. 3). The cross supports 77 and 78 are carried on the rods or posts 28 which extend from the rear of the carrier 29.

The ends of the posts 28 are threaded for the reception of nuts 81 which hold the cross supports in position. By adjusting and resetting the nuts 81, the guide bars 74 and 76 and thereby the plane of the sensitized strips may be adjusted forwardly and rearwardly with respect to the lens assembly in its two adjusted positions.

It will be noted that the spools 62 and 63 are carried by the light guard 44 and that the rolls 72 and 73 rotate on a shaft 82 carried by brackets 83 extending from the cross support 77. With this arrangement the entire assembly, including the spools, the rolls 72 and 73 and the strip feeding mechanism is shifted when the carrier is adjusted by actuating the hand piece 34.

Figure 10:
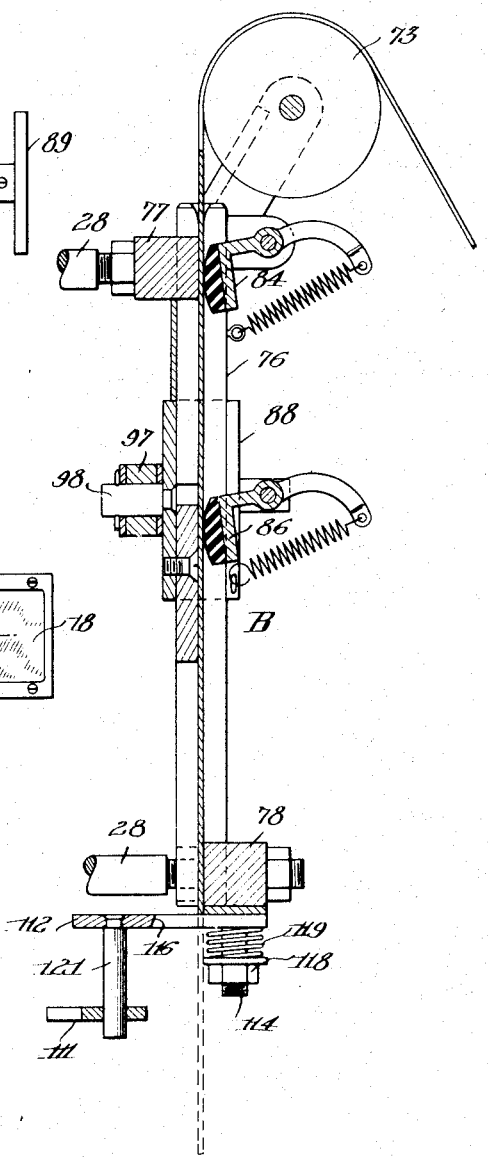
Fig. 10 is a sectional view showing the sensitized paper feeding mechanism.

Each of the strip or paper feeding mechanisms is preferably of the same construction, one of them being shown in Fig. 10. The feeding mechanism comprises a pivoted holding finger 84 and a movable pivoted feeding finger 86. The feed fingers for the respective strips are supported from feed carriages 87 and 88 which are shiftable on the strip guide bars. For the purposes of this application it is sufficient to state that the holding finger 84 holds the strip during the upward movement of the carriage, for example, the carriage 87 after which the exposure is made. The feed finger during the upward movement of the carriage slides over the strip. After exposure the carriage is moved to the downward position during which movement the feed finger 86 positively and accurately feeds the strip while the holding finger 84 slides over the light sensitive material. The feed carriage is retained in the downward position until another exposure is to be made.

An important aspect of my invention is the provision of a single control element for actuating both strip feeding carriages. This arrangement is important for the reason that it frees the operator from the necessity of distinguishing between two controls with the attendant possibility of actuating the improper feed carriage control. Such an error would result in a double exposure on one sensitized strip and wastage of a section of the other strip.

The mechanism for accomplishing this important advantage is shown most clearly in Figs. 5, 8 and 9, and comprises a hand operated element 89 which is fixed to a control rod 91. The control rod 91 extends into the light tight box and has rigidly secured thereto an arm 92. The arm 92 has pivoted adjacent the end thereof, as shown at 93, a link 94 which in turn is pivoted at 96 to an actuating lever 97. One end of the actuating lever 97 is pivoted on a post 98 supported by and rigid with the carriage 88. The other end of the actuating lever 97 is provided with an elongated slot 99 in which preferably a roller 101 rides. The roller is carried by and rotatable on a post 102 fixed with respect to the carriage 87.

When the parts are in the position shown in Figs. 3 and 5 the stop or end 41 of the strip 39 engages the upper edge of the carriage 87 as shown at 103 (Fig. 5). The end 41 of the metal strip in this position acts as a stop or latch for the carriage 87 and thereby converts the post 102 into a fixed pivot or fulcrum. Upon rotation of the arm 92 in a clockwise direction, as viewed in Fig. 5, the feed carriage 88 may be retracted or moved upward from the exposure position. During this upward movement of the carriage 88 the margins of the slot 99 shift with respect to the roller 101. Rotation of the arm 92 in a counterclockwise direction (Fig. 5) feeds the narrow strip of light sensitive material to bring a new section of the strip into the exposure position. The feed carriage is then left in the downward or advanced position until another exposure is to be made on the narrow strip of sensitized paper.

When it is desired to make an exposure on the wide strip of light sensitive material, the hand control element 34 is actuated or pulled outward. Outward movement of the hand control element shifts the carrier 29 from the position of the parts shown in Fig. 12 to that shown in Fig. 11. This adjustment, as previously mentioned, simultaneously shifts the lens system away from the plane of the sensitized strips in order to bring the lens into proper focal relation with the strips.

When the carrier has been shifted the parts are in the position shown in Fig. 2 in which position the end 42 of the metal strip 39 acts as a stop for the carriage 88. The post 98 then acts as a fixed pivot and, upon rotation of the arm 92 by means of the hand operated element 89, the carriage 87 may be shifted upward and downward to feed and expose successive sections of the wide strip of light sensitive material.

It will be clear from the above that rotation of the hand control element 89 controls the feeding of both strips of light sensitive material and that only the particular strip in the exposure position can be fed and exposed. Not only is the photographer freed from the necessity of directing his attention on the actuation of the proper hand control which would be the case if two controls were employed, but also the feed mechanism out of the exposure position is positively locked against feeding. Moreover, the arrangement minimizes the possibility of error resulting in a double exposure.

The camera shutter which is contained within the housing 17 may be of any suitable type and is actuated by the same hand control element 89 (Figs. 8 and 9) which controls the strip feeding mechanism. An arm 104 is fixed with respect to the control rod 91 and may have secured to the end thereof, as shown at 106, a spring or other type of connection 107. The other end of the spring 107 is connected at 108 to the trip lever 109 of the shutter.

When the hand control 89 is rotated in a clockwise direction, as viewed in Fig. 8, the strip feed carriage in the exposure position is raised out of the exposure field. This operation rotates the arm 104 to tension the spring 107. When the proper tension is on the spring 107 which occurs when the carriage reaches its uppermost position, the shutter is tripped and the exposure made. The photographer may then rotate the hand control 89 in a counterclockwise direction, as viewed in Fig. 8, to drop or advance the strip feed carriage and thereby feed another section of the strip into the exposure position.

While, after exposure, the exposed section of sensitized material may be wound upon another spool, in the type of camera with which my invention is concerned it is the usual practice to cut the exposed strip after the exposure has been made and a new section of the strip fed to the exposure position. This is accomplished by a cut off mechanism shown most clearly in Figs. 4, 13, 14 and 15.

The cut off mechanism comprises a pair of cut off knives 111 and 112. The cut off knives are pivoted at 113 and 114 to the lower cross support 78 and each has a cut off edge 116 preferably formed on the arc of a circle. A shear plate 117 cooperates with each of the cut off knives, as shown in Fig. 15. The cut off knives are pivoted with respect to the cross support, as previously mentioned, by means of nut and bolt assemblies 118 between each of which and the cut off knives 113 and 114 there is interposed a spring 119 for maintaining each cut off knife in pressure engagement with its respective shear plate.

The cut off knife 112 is provided with an elongated pin 121 (Fig. 15) which rides in a slot 122 provided in the cut off knife 111. A spring 123 has one end fixed to the cut off knife 111, as shown at 124, and its other end fixed to the carrier 29, as shown at 126. The spring serves to retain the cut off knives in the inactive position shown in Fig. 13.

The cut off knives are actuated by a cable 127 one end of which is tied to the cut off knife 111 (Fig. 4). The cable extends around a pulley 128 carried by a bracket 129 supported from the wall of the light tight box. The other end of the cable is tied, as shown at 131, to a rod 132 slidable in a sleeve 133. The end of the rod extends outward through the wall of the light tight box and is provided with an external hand control 134.

When an exposure has been made on either of the strips of light sensitive material and the feed carriage of the strip upon which the exposure has been made advanced to remove the exposed section of the strip from the exposure position and advance another section of the strip into the exposure position, the photographer may pull the hand control 134. This operation actuates both cut off knives and cuts off the exposed strip of light sensitive paper. It will be particularly observed that the same hand control 134 actuates both cut off knives so that the same hand control is used regardless of which strip of light sensitive paper is being employed in making exposures.

It is believed that the operation of the so-called duplex camera of my invention will be clear from the foregoing. Of particular importance is the fact that the photographer need operate only three controls and that the same two hand controls 89 and 134 are actuated to feed the sensitized paper, make the exposure and cut off the exposed strip regardless of which strip of light sensitive paper is being employed into the making of exposures. Moreover, in shifting from one strip of light sensitive paper to the other, a single control 34 both shifts the desired strip, together with its feeding mechanism, into the exposure position, and simultaneously adjusts the lens system to the size of the exposure to be made.

While I have shown and described the preferred form of my invention, it will be apparent that various modifications and changes may be made therein, particularly in the form and relationship of parts, without departing from the spirit of my invention as set forth in the appended claims.

I claim:

1. In a camera which has at least two strips of light sensitive material, in combination, means including a movable feed element for feeding each of said strips, a manually operated element, a fixed stop associated with each of said movable feed elements, means between said manually operated element and said movable feed elements for actuating either of said movable feed elements when its associated stop is out of holding position, and means for shifting each of said strips into and out of an exposure position, said shifting of the feed elements automatically engaging the feed element of the strip out of exposure position into engagement with its associated stop.

2. In a camera which has at least two strips of light sensitive material and a lens axis, in combination, a carrier, means mounted on said carrier including a movable feed element for feeding each of said strips, a stop for each of said movable feed elements, said carrier being movable to centralize either of said strips with respect to the lens axis and position the movable feed element of the other strip in engagement with its associated stop, a control member, and means connecting said control member with each of the movable feed elements to actuate the movable feed element which is out of engagement with its associated stop upon actuation of said control member.

3. In a camera which has at least two strips of light sensitive material, lens elements forming an exposure field, a hand control member, means actuated by said hand control member for adjusting said elements to vary the distance between the lens and the strips in accordance with the width of the strip upon which the exposure is to be made and simultaneously adjusting said strips so that the strip of light sensitive material upon which the exposure is to be made lies in the exposure field, a camera shutter, means for selectively feeding said sensitized strips including a control element, means actuated by said control element for operating the feeding means of the strip upon which the exposure is to be made, and means actuated by said control element for tripping the camera shutter.

4. In a camera which has at least two strips of light sensitive material and a lens having an axis, in combination, means for adjusting the lens to strip distance in proportion to the width of the strip upon which the exposure is to be made, means actuated by said adjusting means for shifting the lens and strips relative to each other in a direction substantially normal to the lens axis to center the lens axis with respect to the exposure field of the strip upon which the exposure is to be made, means including a movable member for feeding each of said strips, a stop selectively engageable with each of said movable members, a manual control, and means interconnecting said manual control with each of said movable members for actuating the moveable member which is out of engagement with its associated stop.

5. In a camera which has at least two strips of light sensitive material, in combination, means including a feed element for each of said strips for feeding each of said strips independently of the other, a manually operated element, a stop associated with each of said feed elements, means for positioning said stops and feed elements with respect to each other so that one of the feed elements is locked against movement while the other is free to be moved, and means between said manually operated element and each of said feed elements for moving the free feed element upon actuation of said manually operated element.

6. In a camera which has at least two strips of light sensitive material, in combination, means including a feed element for feeding each of said strips independently of the other, a manually operated element, a stop associated with each of said feed elements, means for positioning said stops and feed elements with respect to each other so that one of the feed elements is locked against movement while the other is free to be moved, and means between said manually operated element and said feed elements including a linkage interconnecting said feed elements for moving the free feed elements upon actuation of said manually operated element, and means for shifting each of said strips, including the feeding mechanism therefor, to selectively position either of said strips in an exposure position.

7. In a camera which has at least two strips of light sensitive material, in combination, means including a movable feed element for feeding each of said strips independently of the other, a manually operated element, a link having pivot points on each of said feed elements, an arm pivoted to said link and connected to said manually operated element, a stop associated with each of said feed elements, means for positioning said stops and feed elements with respect to each other selectively so that either one of the feed elements is locked against movement while the other is free to be moved, the parts being constructed and arranged so that the pivot point on the locked feed element acts as a fulcrum about which said link is shifted to move the free feed element upon actuation of said manually operated element.

8. In a camera which has at least two strips of light sensitive material, in combination, means including a movable feed element for feeding each of said strips, a control member, a stop associated with each of said movable feed elements, means for positioning said stops and feed elements with respect to each other so that either of said stops lies in holding engagement with its associated movable feed element, and means comprising a pivoted linkage mechanism pivotally connecting said control member with said movable feed elements for enabling actuation thereof, said linkage mechanism being constructed and arranged so that the movable feed element in engagement with its associated stop acts as a fixed support about which the linkage mechanism may pivot to actuate the other movable feed element.

9. In a camera which has at least two strips of light sensitive material, in combination, means for making exposures on either of said strips of light sensitive material, means comprising a pair of relatively movable cutoff elements for each of said strips for cutting off said strips after exposure by a shearing action said pairs of elements each having a shearing plane and said shearing planes being in different planes, a manually operable member, and means connecting said manually operable member to each pair of cutoff elements.

SAMUEL W. LANGDON.

REFERENCES CITED

The following references are of record in the file of this patent:

UNITED STATES PATENTS

| Number | Name | Date |
| --- | --- | --- |
| 1,818,462 | Caps | Aug. 11, 1931 |
| 1,859,258 | Beidler | May 17, 1932 |
| 1,873,571 | Fried | Aug. 23, 1932 |
| 1,909,424 | Powers | May 16, 1933 |
| 1,945,863 | Mitchell | Feb. 6, 1934 |
| 1,959,922 | Maspons | May 22, 1934 |
| 1,973,483 | Hughey | Sept. 11, 1934 |
| 2,227,259 | Hokanson | Dec. 31, 1940 |
| 2,245,606 | Rauch | June 17, 1941 |
| 2,388,423 | Langdon | Nov. 6, 1945 |

FOREIGN PATENTS

| Number | Country | Date |
| --- | --- | --- |
| 443,815 | Great Britain | Mar. 6, 1936 |